(12) United States Patent
Zepp et al.

(10) Patent No.: US 8,109,540 B2
(45) Date of Patent: Feb. 7, 2012

(54) PIPE JOINT AND RELATED METHOD

(75) Inventors: William Zepp, Maineville, OH (US); James C. Schluter, Franklin, OH (US); James Shade, Middletown, OH (US)

(73) Assignee: Contech Construction Products Inc., West Chester, OH (US)

( * ) Notice: Subject to any disclaimer, the term of this patent is extended or adjusted under 35 U.S.C. 154(b) by 378 days.

(21) Appl. No.: 12/474,902

(22) Filed: May 29, 2009

(65) Prior Publication Data

US 2009/0295149 A1 Dec. 3, 2009

Related U.S. Application Data

(60) Provisional application No. 61/057,567, filed on May 30, 2008.

(51) Int. Cl.
*F16L 17/02* (2006.01)
(52) U.S. Cl. ......... 285/374; 285/903; 138/173; 138/174
(58) Field of Classification Search .................. 285/374, 285/903, 399; 138/173, 174, 172
See application file for complete search history.

(56) References Cited

U.S. PATENT DOCUMENTS

| | | |
|---|---|---|
| 3,188,121 A | 6/1965 | Cude et al. |
| 3,239,254 A | 3/1966 | Campbell |
| 3,520,047 A | 7/1970 | Muhlner et al. |
| 3,550,639 A | 12/1970 | Okuda |
| 3,614,137 A | 10/1971 | Jacobson |
| 3,632,732 A | 1/1972 | Osterhagen et al. |
| 3,749,543 A | 7/1973 | Stansbury |
| 3,794,364 A | 2/1974 | Williams |
| 3,806,301 A | 4/1974 | Osterhagen et al. |
| 3,823,216 A | 7/1974 | Petzetakis |
| 3,926,222 A | 12/1975 | Shroy et al. |
| 3,998,578 A | 12/1976 | Acda |
| 4,005,968 A | 2/1977 | Crawford |
| 4,030,872 A | 6/1977 | Parmann |
| 4,049,480 A | 9/1977 | Kutschke |
| RE29,446 E | 10/1977 | Sonnleitner et al. |
| 4,082,327 A | 4/1978 | Sting et al. |
| 4,107,249 A | 8/1978 | Murai et al. |
| 4,134,949 A | 1/1979 | McGregor |

(Continued)

FOREIGN PATENT DOCUMENTS

DE 20318989 2/2004

(Continued)

*Primary Examiner* — David E Bochna
(74) *Attorney, Agent, or Firm* — Thompson Hine LLP

(57) ABSTRACT

A pipe joint for plastic pipe includes a bell member and a spigot member. The bell member includes a tubular plastic body wall having a radially outer side including a pair of spaced apart circumferentially extending ribs and a metal reinforcement ring located between the ribs. The tubular plastic body wall includes a circumferential plastic ring portion extending between the ribs and radially exterior of the metal reinforcement ring to encase the metal reinforcement ring within the tubular plastic body wall. A radial gap may be provided between the plastic ring portion and the metal reinforcement ring to accommodate differing thermal shrinkage rates as between the two different materials. The spigot member, which is insertable into the bell member, includes a tubular plastic body wall having an internal surface and an external surface and a longitudinal axis and metal reinforcement encased within the tubular plastic body wall. A plurality of plastic ribs extend from the external surface of the tubular plastic body wall and forming a gasket channel.

19 Claims, 10 Drawing Sheets

U.S. PATENT DOCUMENTS

| | | |
|---|---|---|
| 4,141,576 A | 2/1979 | Lupke et al. |
| 4,149,740 A | 4/1979 | Hall |
| 4,150,087 A | 4/1979 | de Putter et al. |
| 4,157,372 A | 6/1979 | Kyomen |
| 4,161,384 A | 7/1979 | McGregor |
| 4,170,448 A | 10/1979 | French |
| 4,177,237 A | 12/1979 | Ueno et al. |
| 4,204,823 A | 5/1980 | Hayes et al. |
| 4,218,208 A | 8/1980 | Hayes et al. |
| 4,239,473 A | 12/1980 | Fulhaber |
| 4,247,136 A | 1/1981 | Fouss et al. |
| 4,266,926 A | 5/1981 | Gordon |
| 4,277,231 A | 7/1981 | Gordon |
| 4,279,853 A | 7/1981 | Ohta et al. |
| 4,299,412 A | 11/1981 | Parmann |
| 4,315,630 A | 2/1982 | French et al. |
| 4,331,625 A | 5/1982 | van de Zee et al. |
| 4,338,716 A | 7/1982 | Marissen et al. |
| 4,353,860 A | 10/1982 | Gordon |
| 4,379,115 A | 4/1983 | Seach et al. |
| 4,395,379 A | 7/1983 | Herder et al. |
| 4,443,031 A | 4/1984 | Borsh et al. |
| 4,474,726 A | 10/1984 | Ohta et al. |
| 4,545,951 A | 10/1985 | Gordon |
| 4,647,074 A | 3/1987 | Pate et al. |
| 4,723,905 A | 2/1988 | Vassallo et al. |
| 4,779,651 A | 10/1988 | Hegler et al. |
| 4,795,197 A | 1/1989 | Kaminski et al. |
| 4,826,028 A | 5/1989 | Vassallo et al. |
| 4,834,430 A | 5/1989 | Vassallo et al. |
| 4,906,010 A | 3/1990 | Pickering et al. |
| 4,913,473 A | 4/1990 | Bonnema et al. |
| 4,969,670 A | 11/1990 | Bonnema et al. |
| 4,971,477 A | 11/1990 | Webb et al. |
| 5,064,207 A | 11/1991 | Bengtsson |
| 5,071,173 A | 12/1991 | Hegler |
| 5,072,972 A | 12/1991 | Justice |
| 5,080,405 A | 1/1992 | Sasa |
| 5,132,073 A | 7/1992 | Nielsen |
| 5,163,717 A | 11/1992 | Wise |
| 5,296,188 A | 3/1994 | Lupke |
| 5,348,051 A | 9/1994 | Kallenbach |
| 5,609,713 A | 3/1997 | Kime et al. |
| 5,632,307 A | 5/1997 | Fawley et al. |
| 5,678,610 A | 10/1997 | Scarazzo et al. |
| 5,765,880 A | 6/1998 | Goddard |
| 5,836,918 A | 11/1998 | Dondlinger |
| 5,992,469 A | 11/1999 | Hegler |
| 5,996,635 A | 12/1999 | Hegler |
| 6,082,741 A * | 7/2000 | Gregoire et al. ............. 285/903 |
| 6,126,209 A | 10/2000 | Goddard |
| 6,199,592 B1 | 3/2001 | Siferd et al. |
| 6,227,578 B1 | 5/2001 | Fukui et al. |
| 6,340,181 B1 | 1/2002 | Amatsutsu |
| 6,343,623 B2 | 2/2002 | Hegler |
| 6,371,154 B1 | 4/2002 | Kesterman et al. |
| 6,460,897 B1 | 10/2002 | Manuli |
| 6,565,350 B2 | 5/2003 | Siferd et al. |
| 6,578,882 B2 | 6/2003 | Toliver |
| 6,712,098 B2 * | 3/2004 | Sakazaki et al. ............. 285/374 |
| 6,840,285 B2 | 1/2005 | Toliver et al. |
| 6,948,718 B2 | 9/2005 | Shaffer et al. |
| 7,063,108 B2 | 6/2006 | Toliver et al. |
| 7,174,922 B2 * | 2/2007 | Bateman et al. ............. 138/173 |
| 7,185,894 B2 * | 3/2007 | Kish et al. ................ 277/616 |
| 7,306,264 B2 | 12/2007 | Goddard et al. |
| 7,434,850 B2 * | 10/2008 | Duininck et al. ............. 285/374 |
| 7,681,929 B1 * | 3/2010 | Schlicht ..................... 285/400 |
| 6,399,002 B1 | 1/2011 | Lupke et al. |
| 2004/0222597 A1 | 11/2004 | Benecke |
| 2006/0012166 A1 | 1/2006 | Siferd et al. |

FOREIGN PATENT DOCUMENTS

| | | |
|---|---|---|
| FR | 2457429 | 12/1980 |
| WO | WO 2003/040604 | 5/2003 |
| WO | WO 2005/063465 | 7/2005 |
| WO | 2006/028365 | 3/2006 |

* cited by examiner

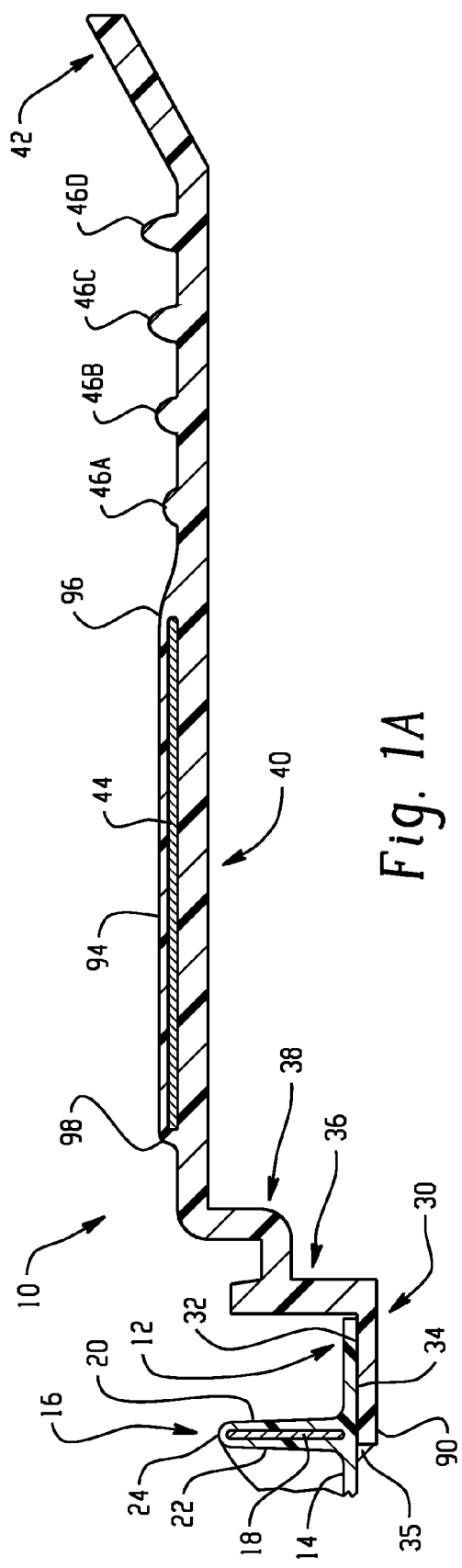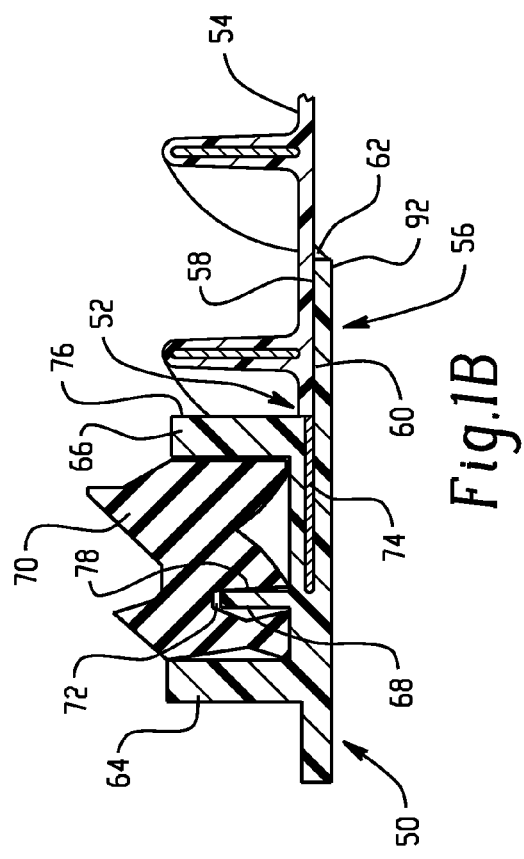

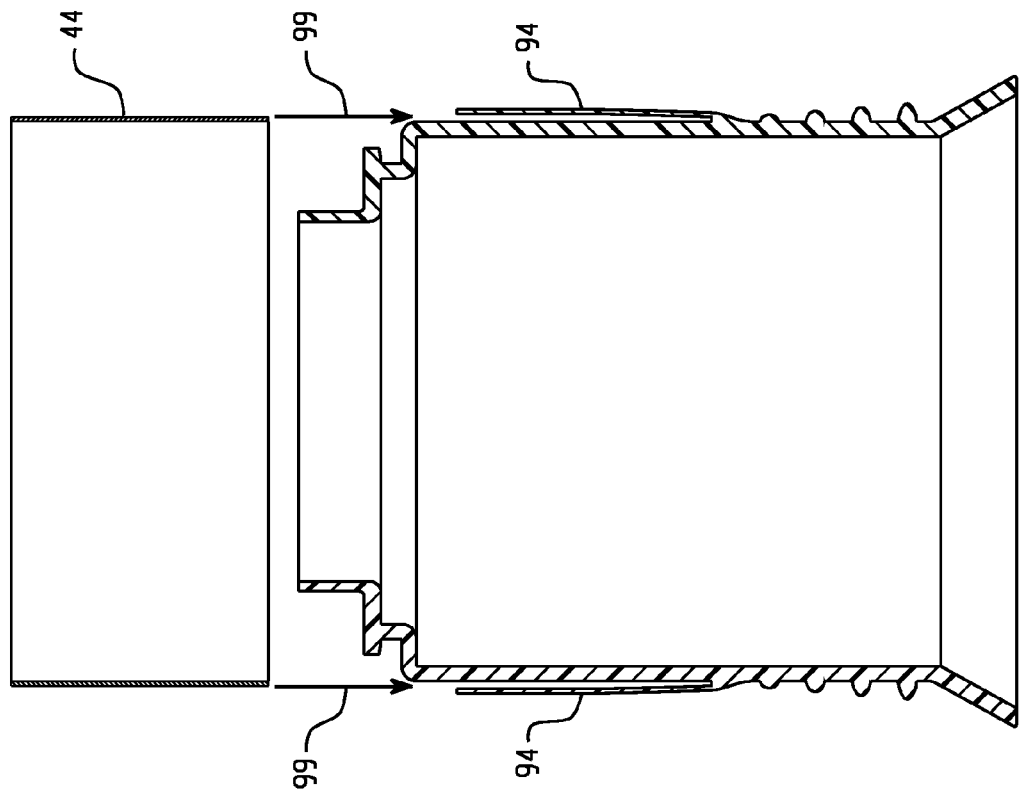
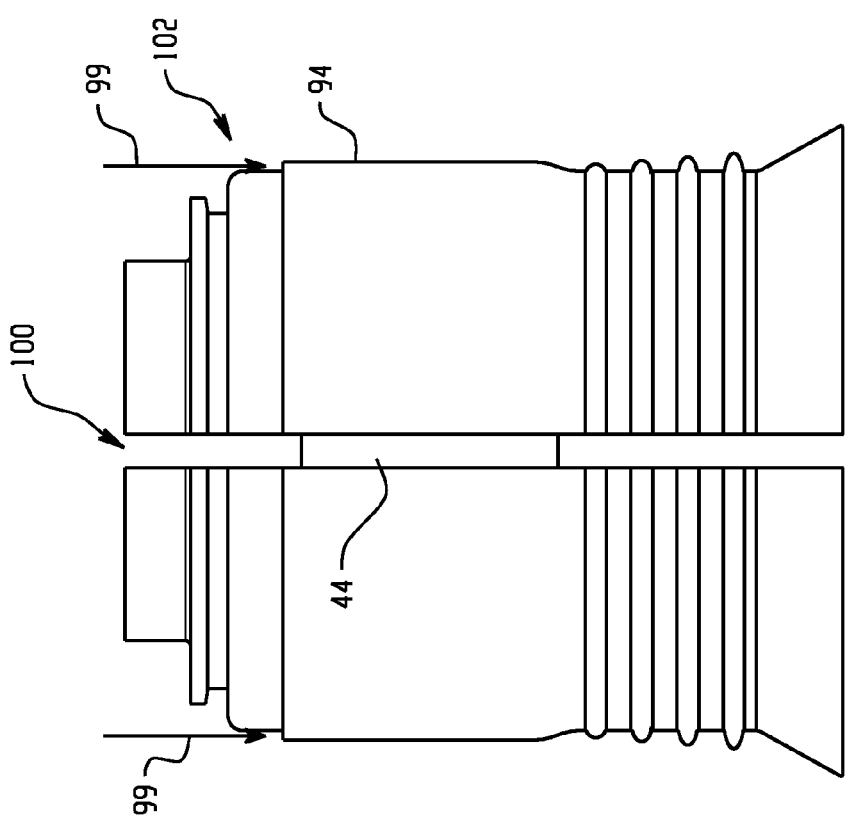
Fig. 4B
Fig. 4A

PIPE JOINT AND RELATED METHOD

CROSS-REFERENCES

This application claims the benefit of U.S. Provisional Application Ser. No. 61/057,567, filed May 30, 2008, the entirety of which is hereby incorporated by reference.

TECHNICAL FIELD

This application relates generally to a pipe systems utilized to convey liquids under gravity induced flows and more particularly to a pipe joint useful in connecting together pipes in such systems.

SUMMARY

In an aspect, a bell member for a pipe joint includes a tubular plastic body wall having a radially outer side including a pair of spaced apart circumferentially extending ribs and a metal reinforcement ring located between the ribs. The tubular plastic body wall includes a circumferential plastic ring portion extending between the ribs and radially exterior of the metal reinforcement ring to encase the metal reinforcement ring within the tubular plastic body wall. A radial gap may be provided between the plastic ring portion and the metal reinforcement ring to accommodate differing thermal shrinkage rates as between the two different materials.

In another aspect, a spigot member for a pipe joint includes a tubular plastic body wall having an internal surface and an external surface and a longitudinal axis and metal reinforcement encased within the tubular plastic body wall. A plurality of plastic ribs extend from the outer surface of the tubular plastic body wall and forming a gasket channel, including a first circumferentially extending solid plastic rib, a second circumferentially extending solid plastic rib spaced apart from the first circumferentially extending solid plastic rib, and a third circumferentially extending solid plastic rib positioned between the first circumferentially extending solid plastic rib and the second circumferentially extending solid plastic rib. The third circumferentially extending solid plastic rib defines a rib diameter that is smaller than respective rib diameters defined by each of the first circumferentially extending solid plastic rib and the second circumferentially extending solid plastic rib.

BRIEF DESCRIPTION OF THE DRAWINGS

FIGS. 1A and 1B are partial cross-sections of bell and spigot portions of a pipe joint prior to joinder;

FIGS. 4A and 4B depict a partially formed bell portion in side (metal reinforcement inserted) and cross-sectional (metal reinforcement not yet inserted) views;

DETAILED DESCRIPTION

Figure 2:
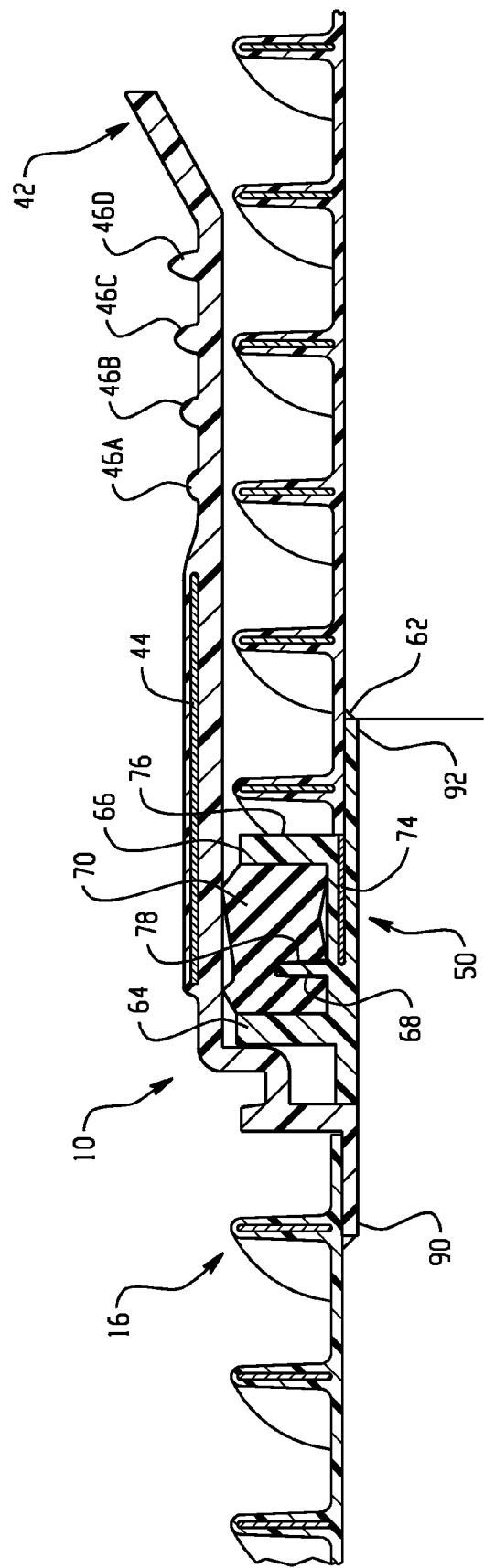
FIG. 2 is a partial cross-section of a pipe joint produced by joining the bell and spigot portions of FIGS. 1A and 1B.

Referring to FIGS. 1 and 2, one embodiment of a pipe joint is illustrated as being formed by mating bell and spigot portions. A bell portion 10 is connected to an end 12 of a polyethylene pipe 14 with reinforced, helically extending ribs 16 having a steel reinforcement strip 18 encased within rib sidewalls 20, 22 and a rib cap 24. The bell portion 10 is also formed of polyethylene material and includes an attachment part 30 with an outer surface 32 engaging the inner surface 34 of the pipe end 12 and a weld seal 35, again of polyethylene, formed between the two. The bell part of the bell portion is formed by a radially outward extending wall 36, a generally L-shaped transition 38, a cylindrical part 40 and a frusto-conical part 42. The cylindrical part 40 includes an encapsulated steel reinforcement band 44 and a number of annular strengthening ribs 46A-46D located between the reinforcement and the frusto-conical part 42.

The spigot portion 50 is connected to an end 52 of a pipe 54 that is similar in configuration to pipe 14. The spigot portion is also formed of polyethylene material and includes a connection part 56 with an outer surface 58 engaged with an inner surface 60 of pipe end 52 and a weld seal 62, again of polyethylene, formed between the two. The outer surface of the spigot portion 50 includes spaced apart, solid PE ribs 64, 66 of similar size with a smaller rib 68 positioned therebetween. A gasket 70 is located between the ribs and includes a lower slotted portion 72 that receives the smaller rib 68. The spigot portion further includes an encapsulated steel reinforcement band 74 with an axial width that extends roughly from side 76 of rib 66 to side 78 of smaller rib 68.

In one embodiment, the bell portion 10 and spigot portion 50 may be formed together (e.g., via extrusion or molding) with end portion 90 of the bell portion connected to end portion 92 of the spigot portion. In the case of extrusion, the two pieces can be separated either before or after being curved into a cylinder form. In the case of molding, the two pieces can be separated prior to attachment to respective pipe end portions. In another embodiment, the bell portion 10 and spigot portion 50 can be formed separately (e.g., each being extruded separately or molded separately). In the latter case, the leg of the attachment part 30 of the bell portion may be formed as part of the profile extrusion, or the initial bell profile extrusion may lack the leg portion, which would be attached later as described below.

Figure 3:
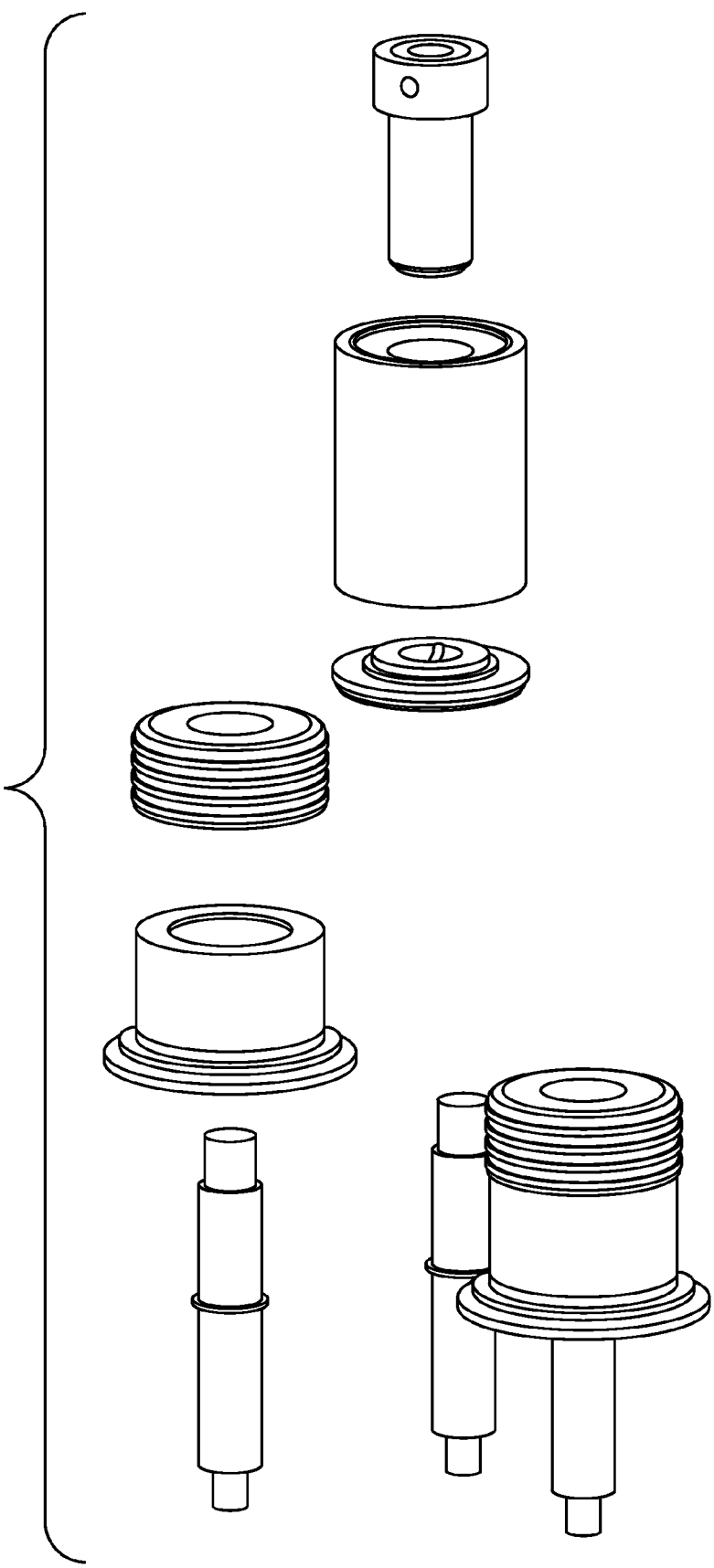
FIG. 3 depicts roll bending equipment.

Considering an embodiment which the pieces are extruded separately. The bell portion is initially extruded as an elongate strip having the cross-section of the bell part (i.e., not including the pipe 14) of FIG. 1A, but with the steel reinforcement 44 not present. In this case, the layer of PE material 94 may be formed as a flap with one end 96 attached and another end 98 unattached enabling the flap to be opened. The open end of the flap faces away from the bell end. The elongate strip is then cut to length suitable for forming a bell portion of desired diameter. The cut strip is then rolled to appropriate diameter with suitable roll bending equipment such as that represented in FIG. 3. A preformed metal reinforcement ring of desired diameter is then placed within the space under the flap 94 (e.g., per the directional arrows 99 of FIGS. 4A and 4B), with the elongate strip 44 having been sized to result in a slight gap 100 at adjacent ends of the rolled strip (e.g., between ¼" and 1" or so), to form a gapped bell structure 102. As shown, the metal reinforcement strip 44 is a full cylinder and traverses the gap 100 of this structure. Typically the metal reinforcement (e.g., steel) may be a preformed, sized continuous cylinder (e.g., created by bending an elongate steel plate into a cylinder shape and joining the adjacent ends of the steel plate by butt welding, fasteners, crimping or other suitable means).

Figure 5A:
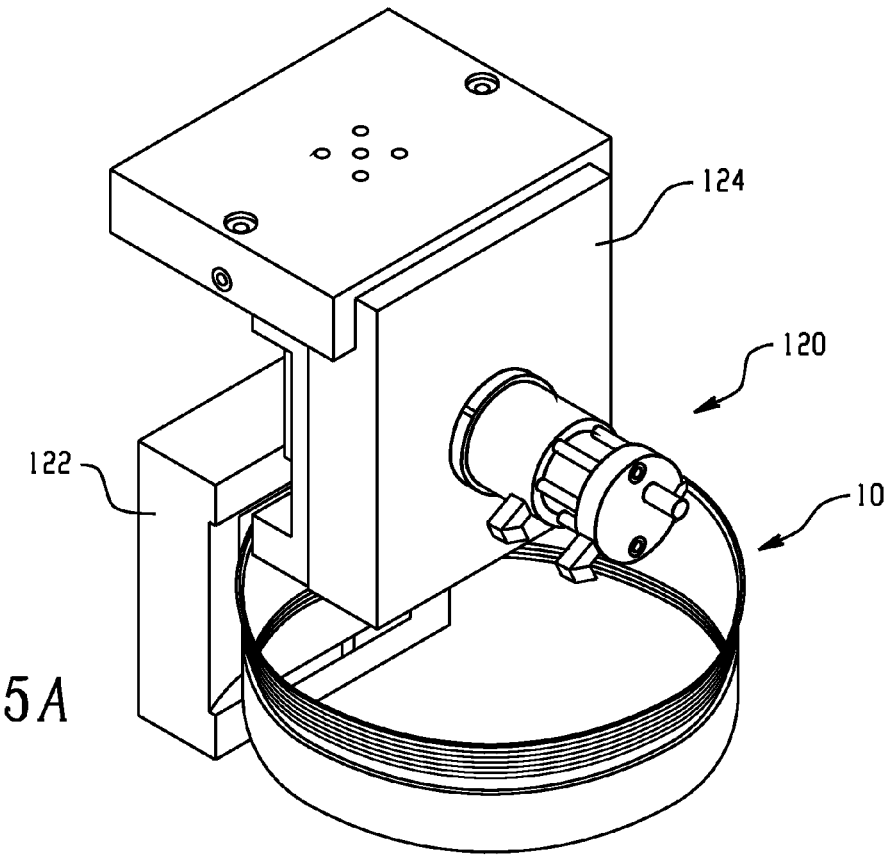
FIG. 5 shows an overmolding fixture.
Figure 5B:
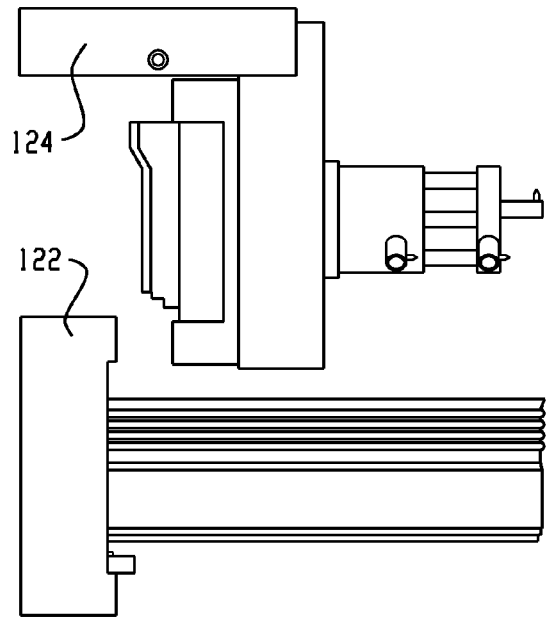
Figure 5C:
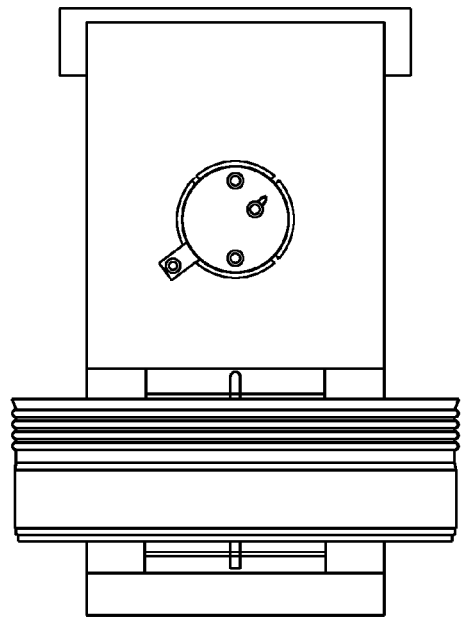

The gapped bell structure 102 is then placed in an overmold fixture and the plastic cylinder of the bell is completed via an overmold process (e.g., using the same material as the strip, preferably PE) that fills the gap 102 with plastic in the same profile as the rest of the unit. At this point the flap 94 remains largely unsealed, though in the gap region 102 the reinforcement may be completely encased. Referring to FIGS. 5A, 5B and 5C an overmold assembly 120 is shown in isometric, side and front views, with the bell structure in place for overmolding, but with the exterior 122 and interior 124 overmold components in open position. The interior overmold component 124 is moved downward to close the assembly over the bell and then the plastic is injected for molding.

Figure 6A:
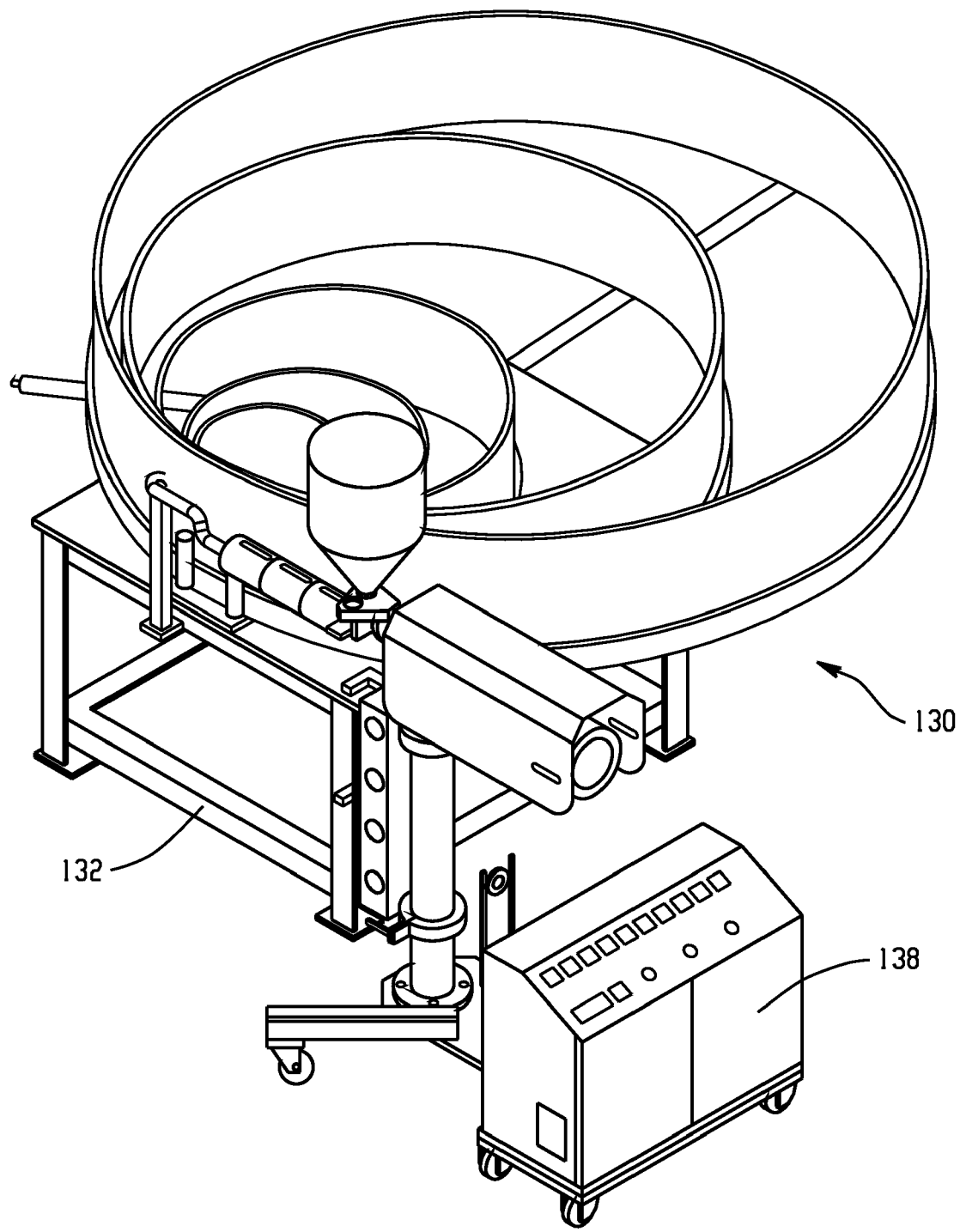
FIG. 6 shows a co-extrusion fixture.
Figure 6B:
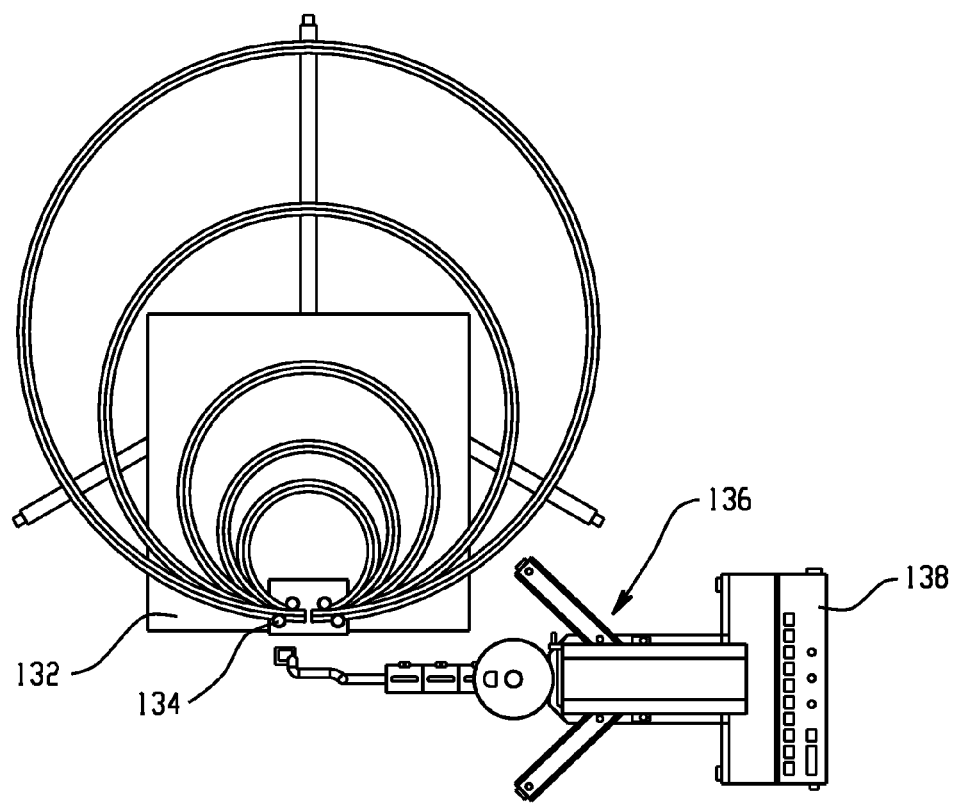
Figure 6C:
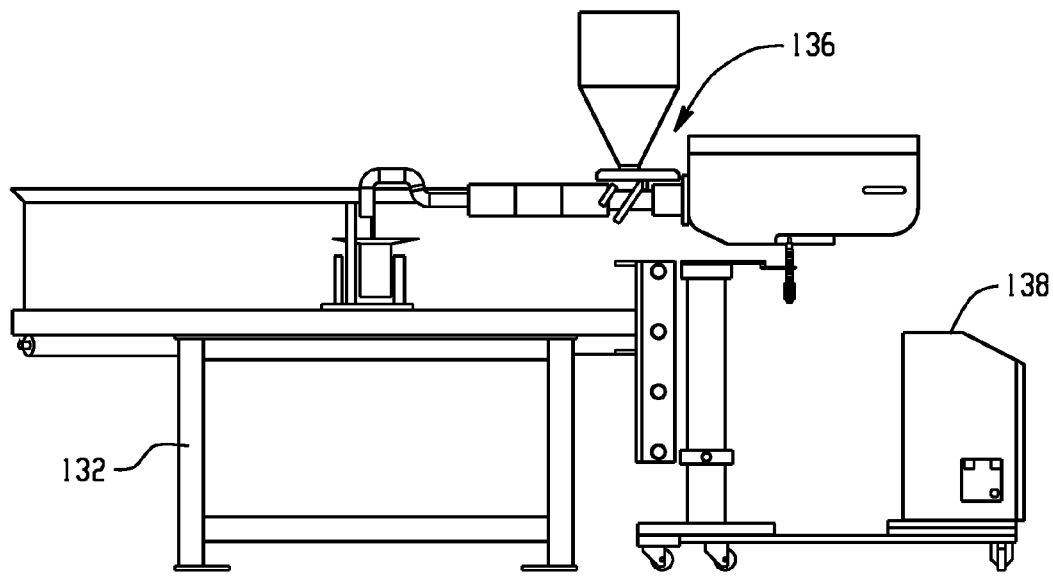
Figure 7A:
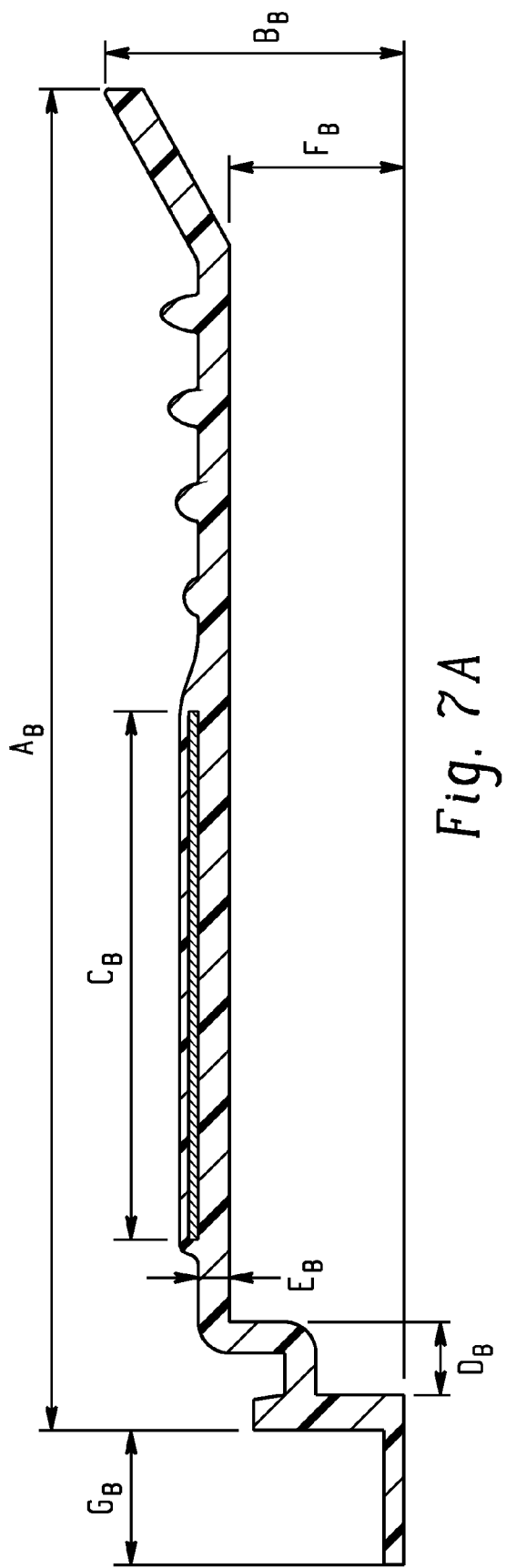
FIGS. 7A and 7B are partial cross-sections of bell and spigot portions respectively with representative dimension indicators.
Figure 7B:
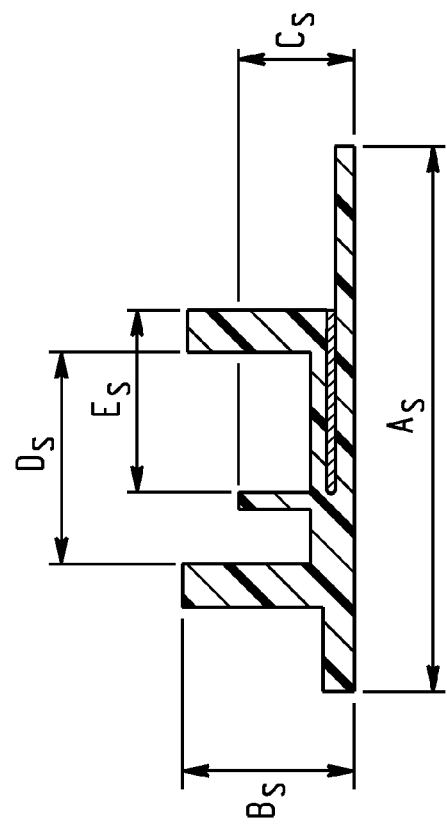

Once overmolding of the gap 100 is completed, the structure is placed in an extruder fixture that utilizes one or more nozzles to form a weld seal at end 98 of the flap while the bell structure is rotated past the nozzle of the fixture. Full sealing of the flap results in a completed bell unit in which the steel reinforcement 44 is completely encased within the plastic of the bell wall. Where the bell profile is initially formed lacking the leg of the attachment part 30, the leg can be attached using a weld seal in the same fixture and step while the flap is being sealed. Referring to FIGS. 6A, 6B and 6C an extruder assembly 130 is shown in isometric to and side views, and includes a table/fixture 132 that supports and rotates the bell through a rotation assembly 134 mounted thereon. As shown, the table can be utilized to support and rotate multiple different diameters of bells or spigots for flap sealing. An extrusion system 136 is mounted alongside the fixture with nozzles positioned and oriented to seal the flap. A control unit 138 is provided for automatically controlling the operation of the extruder.

The completed bell unit can then be attached to a pipe. In this regard, referring back to FIG. 1A, the smaller diameter attachment part 30 of the bell unit is inserted within a pipe end and a suitable attachment fixture with nozzles may be used to form the weld seal 35. In another embodiment ultrasonic or friction welding could be used to form the weld seal 35.

In the case of a bell profile that is molded rather than extruded, the initial molding may take the form of a complete cylinder (i.e., no gap) of desired diameter with the flap 94 again having a free end. The reinforcement is inserted beneath the flap and the process proceeds in much the same manner described above using the co-extruder fixture and then attaching to a pipe end.

The spigot portion may be formed in much the same way as the bell portion, using either extrusion or molding to form the profile with the rib 66 defining the end of an unsealed flap for receiving the reinforcement 74. Attachment of the spigot to the pipe end can also be completed in the same manner as with the bell portion.

As a general rule, each length of pipe for a pipe system will be formed with one end having a bell portion 10 attached and the opposite end having a spigot portion 50 attached. Multiple pipe lengths can then be connected end to end during a given installation, with spigot portions inserted into bell portions to provide a sealed connection. Positioning sized cylindrical metal reinforcements within the wall of both the spigot portion and the bell portion in the region of the gasket aids in maintaining a desirable seal.

The exact thickness and size of the various parts of any bell portion or spigot portion can be varied depending upon the structural requirements and intended diameter usage. A distinct profile could be provided for each pipe diameter. A single profile could be used for multiple diameters or diameters within a certain specified range.

As noted above, the exact profile and dimensions of bell and spigot portions could vary. However, applicant has found the following exemplary dimensions (provided in ranges in Tables I and II below) to be both practical and advantageous.

TABLE I

Bell Dimensions (inches)- Polyethylene Material With Steel Reinforcement

| Pipe Diameter | $A_B$ | $B_B$ | $C_B$ | $D_B$ | $E_B$ | $F_B$ | $G_B$ |
|---|---|---|---|---|---|---|---|
| 24" | 7"-9" | 1"-1.5" | 3.1"-3.4" | 0.250"-0.350" | 0.100"-0.150" | 0.500"-1.00" | 0.50"-1.50" |
| 30" to 42" | 7.75"-9.75" | 1.7"-2.2" | 3.35"-3.65" | 0.425"-0.525" | 0.215"-0.265" | 0.75"-1.25" | 0.50"-1.50" |
| 48" to 60" | 8.3"-10.3" | 2.1"-2.6" | 3.6"-3.9" | 0.44"-0.54" | 0.3"-0.35" | 1.05"-1.55" | 0.50"-1.50" |
| 66" to 96" | 10"-12.5" | 2.35"-2.85" | 5.3"-5.7" | 0.67"-0.77" | 0.49"-0.55" | 1.20"-1.70" | 0.50"-1.50" |

TABLE II

Spigot Dimensions (inches)- Polyethylene Material With Steel Reinforcement

| Pipe Diameter | $A_S$ | $B_S$ | $C_S$ | $D_S$ | $E_S$ |
|---|---|---|---|---|---|
| 24" | 2.5"-3.1" | 0.6"-0.9" | 0.50"-0.55" | 0.95"-1.1" | 0.85"-0.95" |
| 30" to 42" | 3"-3.6" | 0.8"-1.2" | 0.61"-0.67" | 1.2"-1.4" | 1.05"-1.15" |
| 48" to 60" | 3.25"-3.85" | 1.1"-1.5" | 0.90"-0.98" | 1.45"-1.65" | 1.24"-1.34" |
| 66" to 96" | 3.85"-4.6" | 1.15"-1.55" | 0.86"-0.94" | 1.75"-1.95" | 1.67"-1.77" |

It is recognized that the flap could also be sealed by a heat welding process. For example, heat welding could be achieved by initially forming the free end of the flap (or a corresponding segment of the main bell body) with a bead (or other formation) of sufficient plastic that could be melted (e.g., by a heater) to bond the flap to the free end of the flap to rest of the bell.

Figure 8:
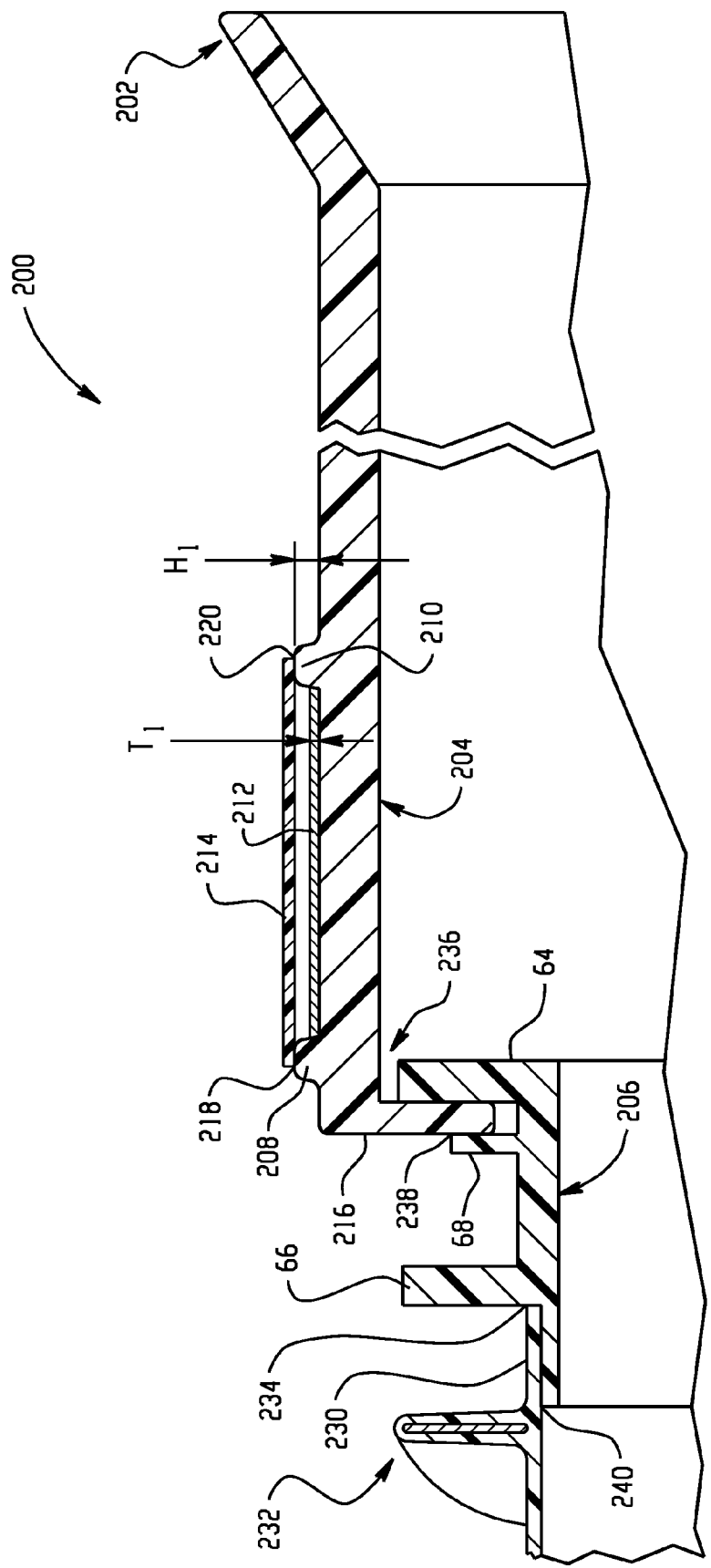
FIG. 8 is a partial cross-section of an alternative bell end structure.

Referring now to FIG. 8, an alternative embodiment of a pipe joint bell 200 is illustrated in partial cross-section. The bell 200 could be utilized in conjunction with the spigot structure of FIG. 1B, or another suitable spigot structure.

Bell 200 includes a frusto-conical end part 202, a main cylindrical part 204 and a reduced diameter pipe connecting part 206. Cylindrical part 204 includes raised solid ribs 208 and 210 between which a steel, or other material, reinforcement ring 212 is placed, and an annular plastic strip 214 encases the steel ring 212 within the bell wall. To produce the bell of this embodiment, a primary bell portion, consisting of end part 202 at one end, main part 204 with external ribs 208, 210 and downwardly projecting flange or leg 216, is extruded together as an elongated strip. The extruded strip is then cut to length suitable for forming a bell portion of desired diameter. The cut strip is then rolled to the proper diameter. The rolled strip is then either overmolded or butt fused to form a completed ring. A metal reinforcement ring is then placed over the outer portion of the bell between the ribs 208 and 210. In this regard, the metal reinforcement ring may be placed by initially wrapping a steel band and then butt welding the ends of the steel band to complete the reinforcement ring. The plastic ring 214 is then placed over the reinforcement, with side edges of the plastic ring sitting atop land areas of the ribs 208, 210. The plastic ring 214 may be preformed into a cylinder of desired diameter before placing it on the bell ring. A co-extrusion process is then used to seal the plastic ring to the ribs 208, 210, with a weld bead applied at locations 218 and 220, completing the encasement of the reinforcement ring 214.

In order to connect the primary bell portion to a pipe, a secondary bell portion (e.g., the connecting part 206) is initially formed separately from the primary bell portion. In one implementation, the secondary part 206 is formed from the same extruded strip as that used for the spigot. The strip is cut to length and rolled to diameter and then either overmolded or butt-welded to form a complete cylinder. The unsealed end of the flap that would normally receive the spigot reinforcement is welded closed using an extrusion weld or heat weld, which could occur before or after the cylinder formation, eliminating the flap. The connecting part 206, now formed as a separate ring structure, is then inserted within the end 230 of a pipe 232. The connecting part 206 is tack welded in place to the pipe end (e.g., at the location 234 where rib 66 abuts the pipe end).

The formed primary bell portion is then placed over the connecting part 206 to position the leg 216 in the space between ribs 64 and 68. In this regard, the primary bell portion may be angled to move the primary bell portion onto the end of the connecting part 206, the upper part of the leg 216 placed between the ribs 64 and 68 and the lower part of the primary bell portion then allowed to drop downward and onto the end of the connecting part. Centering spacers are then inserted into the annular space 236 between the radially exterior end of rib 64 and the radially inner surface of cylindrical part 204. Once the proper uniform spacing is achieved, the primary bell portion is tacked in place to the connecting part 206 (e.g., at the location 238 where rib 68 abuts against leg 216). The connecting part 206 is then permanently welded to the pipe end (e.g., by placing a continuous internal plastic weld bead or seal at the location 240 where the inside end of the connecting part 206 meets the inner surface of the pipe end 230). The centering spacers are removed and then the primary bell portion is permanently welded to the connecting part 206 (e.g., by placing a continuous internal plastic weld bead or seal within the annular space 236.

As shown in FIG. 8, the inside surface of the plastic ring 214 is spaced away from the external surface of the reinforcement ring. The purpose of providing this spacing is to account for the differing rates of thermal shrinkage as between the plastic (e.g., polyethylene) and the metal reinforcement (e.g., steel). In this regard, at colder temperatures the shrinkage rate of the plastic can be 10 times that of the steel and providing the spacing prevents the plastic ring 214 from shrinking so much that it wraps too tightly upon the steal reinforcement and ruptures or breaks. In one embodiment, the radial height H1 of the ribs 208 and 210 may be at least three times the radial thickness T1 of the reinforcement 214. For example, reinforcement having a thickness of 40-75 thousands of an inch may be used in conjunction with ribs having a height of 150 to 250 thousands of an inch. In such case the radial thickness of the gap between the reinforcement and the plastic ring would generally be at least 1oo thousandths of an inch.

Figure 9:
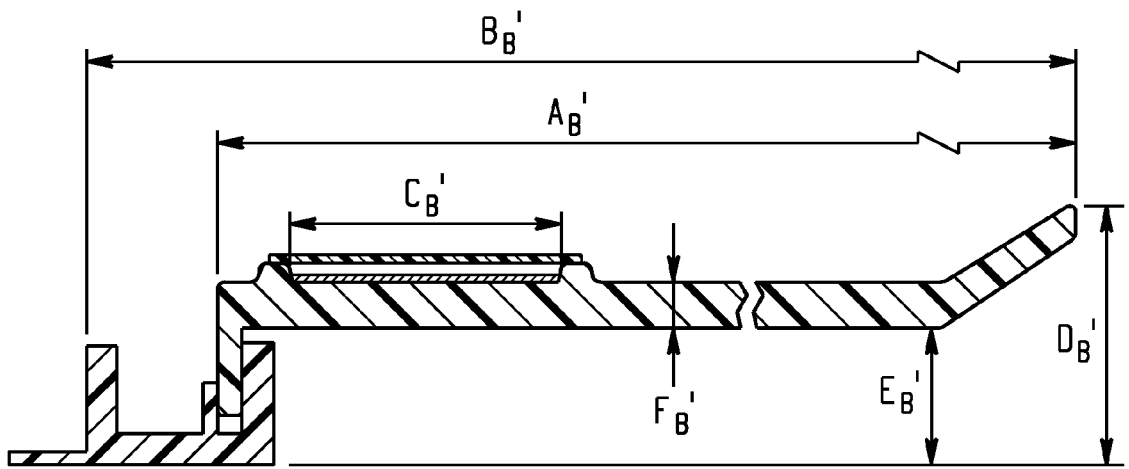
FIG. 9 is a partial cross-section of the bell end structure of FIG. 8 with dimension indicators.

Referring now to FIG. 9 and Table III below, the following exemplary dimensions have been found to be both practical and advantageous for the bell structure of FIG. 8.

TABLE III

| Bell Dimensions (inches)- Polyethylene Material With Steel Reinforcement | | | | | | |
|---|---|---|---|---|---|---|
| Pipe Diameter | $A_{B'}$ | $B_{B'}$ | $C_{B'}$ | $D_{B'}$ | $E_{B'}$ | $F_{B'}$ |
| 24" | 7.0-8.5" | 8.00-9.50" | 2.9-3.6" | 1.3-1.9" | 0.5-1.1" | 0.90-0.17" |
| 30" to 42" | 7.5-9.0" | 8.75-9.25" | 3.1-3.9 | 1.5-2.3" | 0.7-1.5" | 0.18-0.28" |
| 48" to 60" | 8.0-9.5" | 9.50-11.00" | 3.6-4.4" | 1.8-2.6" | 1.0-1.8" | 0.27-0.37" |
| 66-96" | 10.5-12.0" | 12.25-13.75" | 5.5-6.5" | 2.2-3.0" | 1.4-2.2" | 0.27-0.37" |

Figure 10:
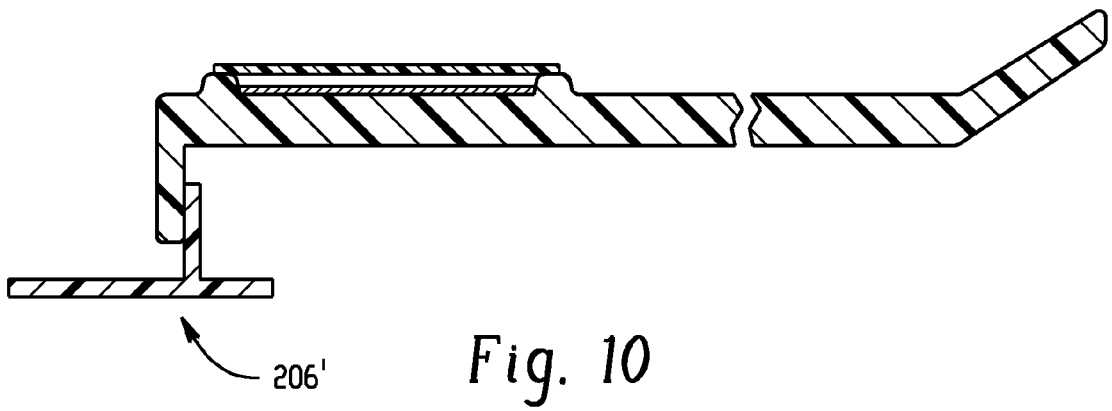
FIGS. 10 and 11 depict partial cross-sections of alternative bell-end structures.
Figure 11:
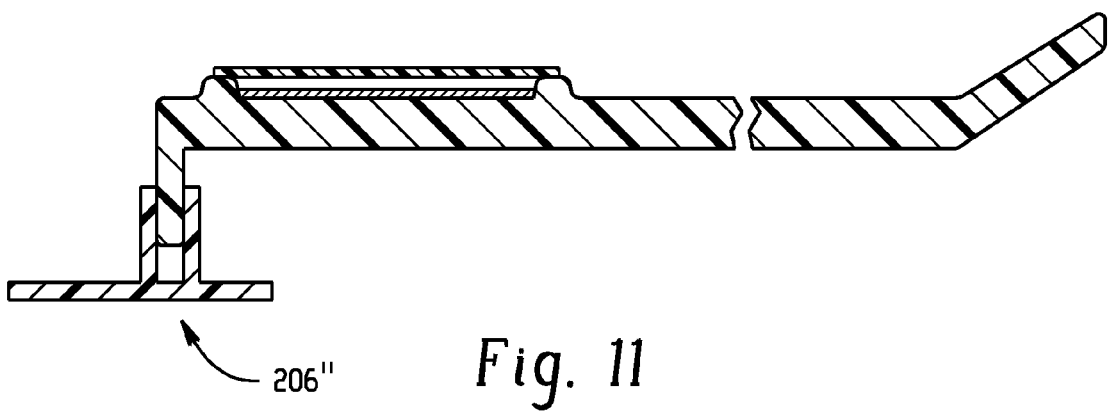

It is to be clearly understood that the above description is intended by way of illustration and example only and is not intended to be taken by way of limitation, and that changes and modifications are possible. For example, while FIG. 8 illustrates one embodiment of a multi-piece bell structure, it is recognized that alternatives are possible, such as those shown in FIGS. 10 and 11 that do not rely upon the use of the spigot extrusion to form the connecting parts 206' and 206" of the bell. Accordingly, other embodiments are contemplated and modifications and changes could be made without departing from the scope of this application.

The invention claimed is:

1. A spigot member for a pipe joint, the spigot member comprising:
   a tubular plastic body wall having an internal surface and an external surface and a longitudinal axis;
   a metal reinforcement encased within the tubular plastic body wall;
   a plurality of plastic ribs extending from the external surface of the tubular plastic body wall and forming a gasket channel, including a first circumferentially extending solid plastic rib, a second circumferentially extending solid plastic rib spaced apart from the first circumferentially extending solid plastic rib, and a third circumferentially extending solid plastic rib positioned between the first circumferentially extending solid plastic rib and the second circumferentially extending solid plastic rib, the third circumferentially extending solid plastic rib defining a rib diameter that is smaller than respective rib diameters defined by each of the first circumferentially extending solid plastic rib and the second circumferentially extending solid plastic rib.

2. The spigot member of claim 1, wherein:
the first circumferentially extending solid plastic rib is positioned toward a distal end of the spigot member and the second circumferentially extending solid plastic rib is positioned toward a pipe connected end of the spigot member, the third circumferentially extending solid plastic rib is positioned nearer to the first circumferentially extending solid plastic rib than to the second circumferentially extending solid plastic rib.

3. The spigot member of claim 2, further comprising:
an annular gasket positioned in the gasket channel, a radially inward side of the gasket includes a slot into which the third circumferentially extending solid plastic rib is positioned.

4. The spigot member of claim 3 wherein the metal reinforcement is positioned so as to be located radially inward of at least a portion of the gasket that lies between the third circumferentially extending solid plastic rib and the second circumferentially extending solid plastic rib.

5. The spigot member of claim 4 wherein the metal reinforcement is not located radially inward of the gasket in a region that lies between the third circumferentially extending solid plastic rib and the first circumferentially extending solid plastic rib.

6. The spigot member of claim 3 wherein the gasket includes a first radial wing extending outward in a region that lies between the third circumferentially extending solid plastic rib and the first circumferentially extending solid plastic rib, and a second radial wing extending outward in a region that lies between the third circumferentially extending solid plastic rib and the second circumferentially extending solid plastic rib.

7. The spigot member of claim 6 wherein the second radial wing extends outward further than the first radial wing and the second radial wing has an annular width that is greater than an annular width of the first radial wing.

8. The spigot member of claim 6 wherein the first radial wing is angled from a lower part positioned proximate the first circumferentially extending solid plastic rib to an upper part located nearer to the third circumferentially extending solid plastic rib, the second radially wing is angled from a lower part positioned toward the third circumferentially extending solid plastic rib to an upper part located nearer to the second circumferentially extending solid plastic rib.

9. A plastic pipe having a plurality of helically extending composite ribs extending along an outer surface thereof, the plastic pipe having the spigot member of claim 1 connected at one end thereof.

10. A multi-pipe structure including the spigot member of claim 9, comprising:
the spigot member of the pipe of claim 9 positioned within a bell end structure of a second pipe having a plurality of helically extending composite ribs extending along an outer surface thereof,
a gasket in the gasket channel of the spigot member and having an outer surface pressed against an inner surface of the bell end structure.

11. The multi-piece pipe structure of claim 10, wherein the bell end structure comprises:
a tubular plastic body wall having a radially outer side including a pair of spaced apart circumferentially extending ribs;
a metal reinforcement ring located between the ribs;
the tubular plastic body wall including a circumferential plastic ring portion extending between the ribs and radially exterior of the metal reinforcement ring to encase the metal reinforcement ring within the tubular plastic body wall.

12. The multi-piece pipe structure of claim 11 wherein an exterior surface of the metal reinforcement ring of the bell end structure is spaced from the interior surface of the plastic ring portion providing a shrinkage gap therebetween.

13. A bell member for a pipe joint, the bell member comprising:
a tubular plastic body wall having a radially outer side including a pair of spaced apart circumferentially extending ribs;
a metal reinforcement ring located between the ribs;
the tubular plastic body wall including a circumferential plastic ring portion extending between the ribs and radially exterior of the metal reinforcement ring to encase the metal reinforcement ring within the tubular plastic body wall, wherein an exterior surface of the metal reinforcement ring is spaced from the interior surface of the plastic ring portion providing a shrinkage gap therebetween.

14. The bell member of claim 13 wherein a radial height of each rib is at least three times greater than a radial thickness of the metal reinforcement ring.

15. The bell member of claim 13 wherein a radial thickness of the shrinkage gap is at least 100 thousandths of an inch.

16. A spigot and bell pipe joint structure, comprising:
a spigot member including:
a tubular plastic body wall having an internal surface and an external surface and a longitudinal axis;
a metal reinforcement encased within the tubular plastic body wall;
a plurality of plastic ribs extending from the external surface of the tubular plastic body wall and forming a gasket channel, including a first circumferentially extending solid plastic rib, a second circumferentially extending solid plastic rib spaced apart from the first circumferentially extending solid plastic rib, and a third circumferentially extending solid plastic rib positioned between the first circumferentially extending solid plastic rib and the second circumferentially extending solid plastic rib;
an annular gasket positioned in the gasket channel, a radially inward side of the gasket includes a slot into which the third circumferentially extending solid plastic rib is positioned, wherein the metal reinforcement is positioned so as to be located radially inward of at least a portion of the gasket that lies between the third circumferentially extending solid plastic rib and the second circumferentially extending solid plastic rib;
a bell member including:
a tubular plastic body wall;
a metal reinforcement ring located within the tubular plastic body wall;
where the spigot member is inserted within the bell member, the metal reinforcement ring of the bell member overlapped with the metal reinforcement of the spigot member, an outer portion of the gasket pressed against an inner surface portion of the tubular plastic body wall of the bell member, the inner surface portion located radially inward of the metal reinforcement ring of the bell member.

17. The spigot and bell pipe joint structure of claim 16, wherein the third circumferentially extending solid plastic rib defining a rib diameter that is smaller than respective rib diameters defined by each of the first circumferentially extending solid plastic rib and the second circumferentially extending solid plastic rib.

18. The spigot and bell pipe joint structure of claim 17, wherein a shrinkage gap is provided between an exterior surface of the metal reinforcement ring of the bell member and plastic of the tubular plastic body wall of the bell member.

19. The spigot and bell pipe joint structure of claim 17, wherein:

the first circumferentially extending solid plastic rib is positioned toward a distal end of the spigot member and the second circumferentially extending solid plastic rib is positioned toward a pipe connected end of the spigot member, the third circumferentially extending solid plastic rib is positioned nearer to the first circumferentially extending solid plastic rib than to the second circumferentially extending solid plastic rib; and the metal reinforcement of the spigot member is not located radially inward of the gasket in a region that lies between the third circumferentially extending solid plastic rib and the first circumferentially extending solid plastic rib.

* * * * *